United States Patent [19]

Narbaits-Jaureguy et al.

[11] 3,760,278

[45] Sept. 18, 1973

[54] LIMITED RANGE RADIOCOMMUNICATION SYSTEM

[75] Inventors: Jean Raymond Narbaits-Jaureguy; Henri Billottet, both of Paris, France

[73] Assignee: Thomson-CSF, Paris, France

[22] Filed: Dec. 15, 1971

[21] Appl. No.: 208,172

[30] Foreign Application Priority Data

Dec. 23, 1970 France .............................. 7046504
Apr. 9, 1971 France .............................. 7112745

[52] U.S. Cl. ........................ 325/51, 179/82, 325/21, 325/28, 325/51, 325/53, 246/8, 343/180

[51] Int. Cl. ............................................ H04b 1/00

[58] Field of Search .................. 179/15 BL, 15 BY, 179/82, 11 SW, 2.5 R, 43, 58; 325/51-55, 64, 66, 21, 22; 343/180, 719; 246/8, 29

[56] References Cited

UNITED STATES PATENTS

| | | | |
|---|---|---|---|
| 2,597,818 | 5/1952 | Preston | 325/53 |
| 3,435,415 | 3/1969 | Chur | 325/51 |
| 2,407,417 | 9/1946 | Halstead | 325/55 |
| 3,470,474 | 9/1969 | Rohrer | 325/51 |
| 3,586,977 | 6/1971 | Lustig | 179/1 SW |
| 2,398,741 | 4/1946 | Halstead | 179/2.5 R |

*Primary Examiner*—Albert J. Mayer
*Attorney*—Karl F. Ross

[57] ABSTRACT

A fixed control station in a zone of high traffic density exchanges information with mobile stations aboard vehicles within that zone by short-range radiocommunication. The control station has an antenna in the form of a coaxial cable, with leakage losses, terminated by a dissipative load at one end while its other end is coupled to a transmitter supplying it with a frequency-modulated outgoing carrier destined for the vehicles within range. The outer conductor of the cable is grounded, at its end proximal to the load, through a parallel-resonant network tuned to the frequency of an incoming carrier from transmitter-equipped vehicles; the other end of this conductor, remote from the load, is grounded through a similarly tuned circuit whose inductive branch forms the primary of a transformer coupling it to an associated receiver. A vehicle equipped with a car radio may have switchover means for selectively listening in on a radio program or on traffic information from the control station; a monitoring relay may respond to such traffic information to reverse a switch normally positioned for radio reception.

16 Claims, 13 Drawing Figures

Patented Sept. 18, 1973 3,760,278

5 Sheets-Sheet 1

Jean Raymond NARBAITS-JAUREGUY,
Henri BILLOTTET,
*Inventors*

*By* Karl F. Ross
*Attorney*

Patented Sept. 18, 1973

3,760,278

5 Sheets-Sheet 2

Jean Raymond NARBAITS-JAUREGUY
Henri BILLOTTET,
*Inventors*

By Karl F. Ross
*Attorney*

Jean Raymond NARBAITS-JAUREGUY
Henri BILLOTTET, *Inventors*

By Karl F. Ross
*Attorney*

Patented Sept. 18, 1973 3,760,278

5 Sheets-Sheet 4

Jean Raymond NARBAITS-JAUREGUY,
Henri BILLOTTET,

*Inventors*

*By* Karl F. Ross

*Attorney*

Jean Raymond NARBAITS-JAUREGUY,
Henri BILLOTTET,
*Inventors*

*By* Karl F. Ross
*Attorney*

LIMITED RANGE RADIOCOMMUNICATION SYSTEM

The present invention relates to improvements in limited-range radiocommunication devices. Because of the limited range required, these devices are particularly suitable, for traffic-control purposes and in this context for the establishment of simplex or duplex links between vehicles passing through predetermined zones of high traffic density, and one or more zonal control stations.

To inform the drivers of such vehicles about traffic conditions which they are going to encounter in a zone they are about to enter, is difficult inasmuch as it is necessary to provide them with the information without distracting their attention too much from the actual driving of the vehicle.

Providing the information in the form of a visual signal has the drawback that it momentarily draws the driver's eye away from the road to the signalling devices, and this could have serious consequences if large amounts of information were being communicated since the driver would be too engrossed in the reading of the signal panels and would tend not to look at the road. On the other hand, if the driver is to continue to observe the road then he cannot devote sufficient attention to the panels and they become purposeless.

It is possible to inform drivers by audio means, i.e., by transmitting the required information to them by radio. At the present time, ordinary broadcast transmitters transmit to drivers of radio-equipped cars, the information which might and should be of interest to them at times when traffic conditions are particularly difficult. However, a drawback here, which limits the usefulness of this kind of transmission, is that the transmitters concerned have considerable ranges and therefor reach listening drivers to whom the specific information is not always relevant. Moreover, information thus transmitted is often of a general nature and it is only with difficulty that it can be made to reflect and correct the sometimes critical situation which may be affecting a number of highly localized roads.

It is the object of the present invention to overcome this drawback by establishing a limited-range radio link sufficient to cover a zone of predetermined extent in which traffic conditions are generally difficult.

In accordance with the invention, there is provided a limited-range radiocommunication system for controlled communication between fixed and mobile stations, comprising at each station a transmitting and a receiving section. Each fixed station is equipped with a common transmitting/receiving antenna, consisting of a transmission line 20, with inherent losses, which is coupled to a modulating transmitter 27 and radiates a low-intensity leakage radio-frequency field picked up by the aerials 30 of the mobile stations which are in the vicinity; between the outer conductor of this transmission line and ground turned circuits 92–94 are provided for picking up the radiation emitted by the mobile stations and transmitting the incoming signals to a demodulating receiver 95 coupled thereto.

The invention will be better understood from the ensuing description of embodiments given with reference to the accompanying drawing in which.

Figure 11:
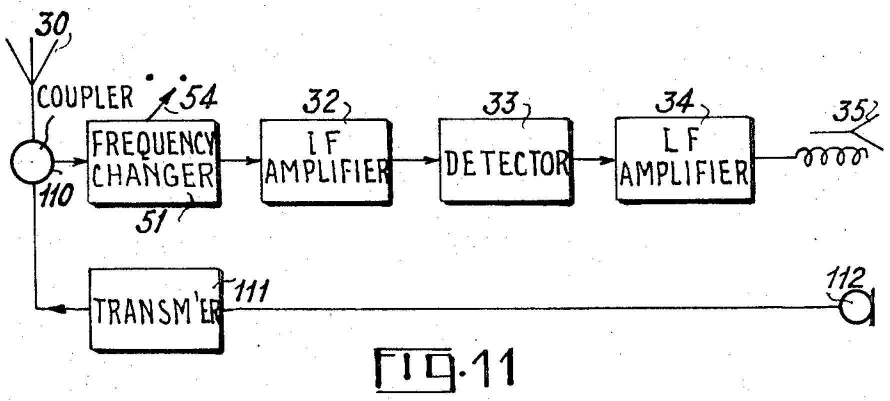
Figure 7:
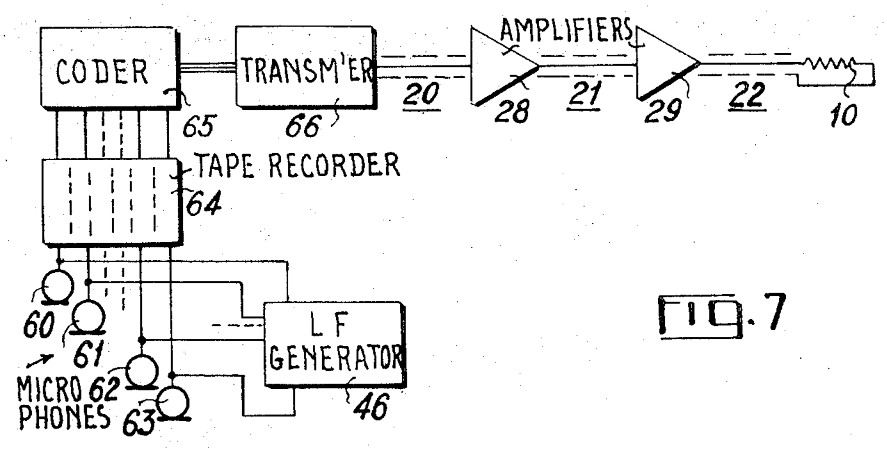
Figure 8:
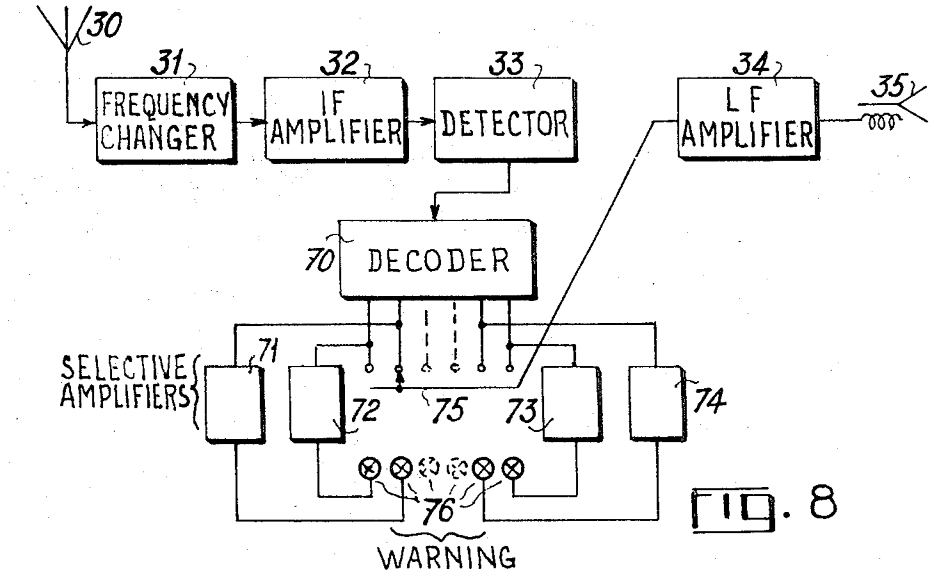
Figure 10:
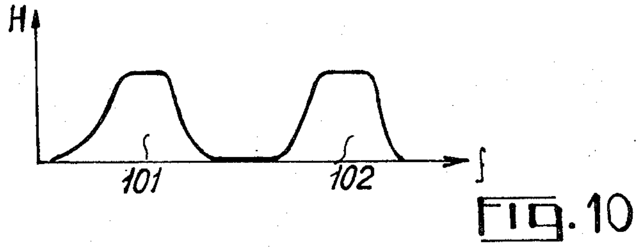
Figure 9:
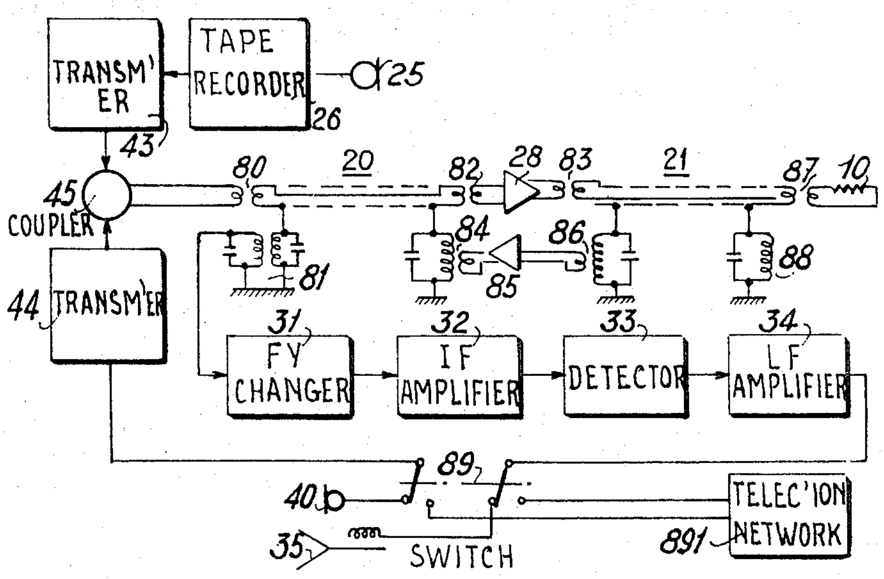
Figure 12:
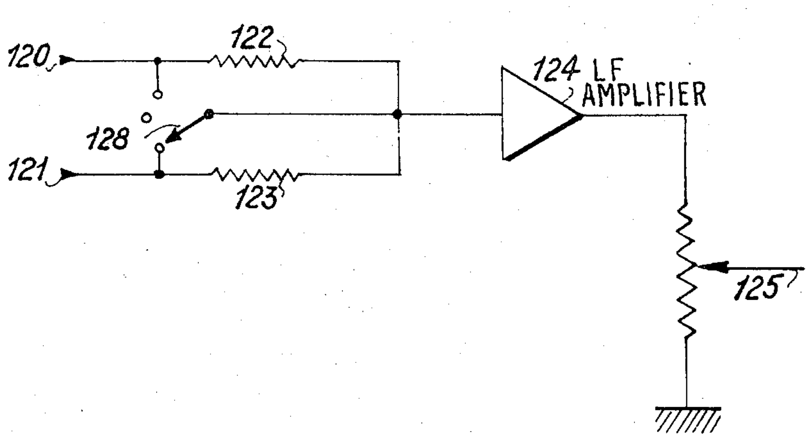
Figure 13:
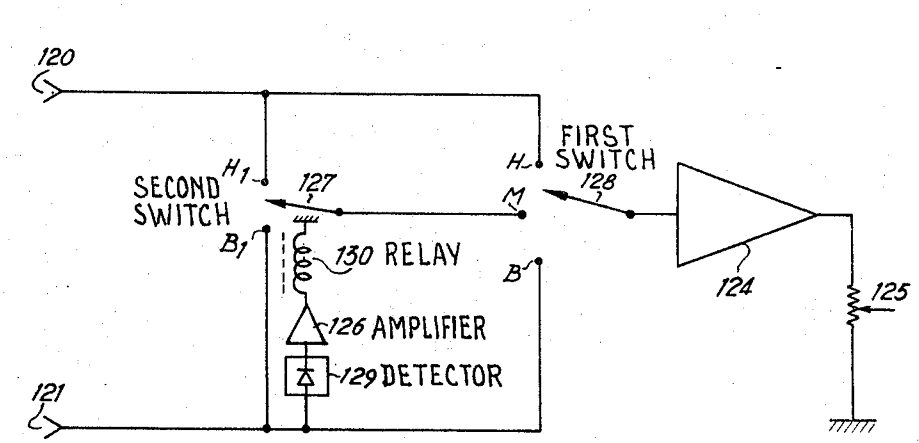

FIGS. 7 and 8 respectively illustrate a limited-radiation device for multiplex operation, and the associated receiver ;

FIG. 9 is a block diagram of a limited-radiation device for both transmission and reception ;

FIG. 10 is a diagram indicating how the passbands of the devices are arranged for transmission and reception, respectively FIG. 11 is a block diagram of a transceiver on board a vehicle ;

FIG. 12 is a diagram indicating how a receiver cooperating with the device in accordance with the invention can be installed with a conventional car-radio receiver ; and FIG. 13 is a variant of FIG. 12.

As stated above the device to which the invention relates is designed to enable the establishment of duplex communications between one or several control stations, located in predetermined zones where traffic conditions are critical so that problems arise which have to be resolved on the spot, and the vehicles which may penetrate these zones or are already moving through them. In order to avoid the drawbacks of the existing solutions to this problem, which either involve an undesirable multiplication of the signal panels with the result that the drivers' attention is distracted from the basic driving function where their eyes are drawn to the instrumentation, or demand that they have to listen as a consequence of transmission of information through local or national radio stations whose ranges and audience coverages are very clearly in excess of what is necessitated by local problems, we have provided a radio device whose range is strictly limited to a zone of predetermined extent such that the instructions to be transmitted to drivers traversing a critical traffic zone will enable the traffic problems developing there to be resolved in a satisfactory manner. This voluntary limitation of range is such that zones adjacent the one under discussion can be equipped with the same means without giving rise to any interference between the different transmitted and/or received signals.

According to a preferred embodiment, in which a communications device embodying our invention is designed to transmit from a control station in a given zone to vehicles penetrating same, that device is also capable, in turn, of receiving transmissions which may be produced for example by patrol vehicles moving through this zone and are directed to the control station or stations.

The limited-range radiocommunication devices in accordance with the invention are generally arranged, in the critical zone which they have to cover, along traffic routes where bottlenecks may occur in the case of road traffic (which is primarily envisaged here). Because of the limitation on the radiation field which is characteristic of these devices, several adjacent critical zones can be equipped in this fashion without any need for modifying the frequency or frequencies of operation of the device since there is no risk of any interference.

Figure 1:
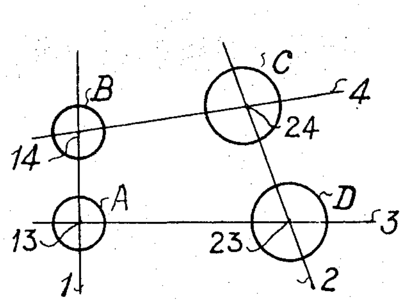
FIG. 1 is a schematic diagram illustrating the establishment of limited-radiation zones.

FIG. 1 schematically illustrates several road routes 1,2,3,4 intersecting at points marked 13,14,23 and 24 around which zones A, B, C and D have been created which may be referred to as critical zones. However, it goes without saying that as circumstances dictate these zones might be located around points other than those shown in the figure.

Figure 2:
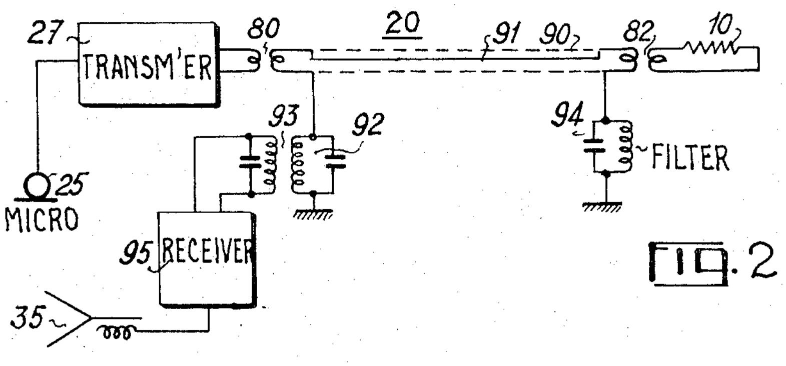
FIG. 2 is a block diagram of a device in accordance with the invention, designed for duplex operation.

FIG. 2 illustrates a diagram of the limited-radiation device which is here designed for both transmission and reception. This device comprises a coaxial line 20 with outer and inner conductors 90, 91 whose overlap coefficient is small. Under these circumstances, losses occur, thus, at the point where a transmitter 27 is connected to the coaxial cable, a leakage radio field is created which is radiated around the cable and has only a short range. This coaxial cable 20 is terminated at each end in impedance-matching transformers 80 and 82. The transformer 80 connects the transmitter 27 to the cable which plays the part of a transmitting antenna. The transmitter 27 transmits at a frequency F1 at a power level. A microphone 25 is used to record the information being transmitted, this information being modulated in the transmitter (preferably by frequency modulation) upon the radio-frequency carrier frequency F1. The other matching transformer 82 supplies a resistor 10 which dissipates the residual high-frequency power at the end of the cable. At its two ends, the outer conductor 90 of the coaxial cable 20 is connected to two tuned circuits 92 and 94, respectively. The circuit 92 includes a primary of a transformer 93 whose secondary is connected to a receiver 95 and forms part of its input circuit. The circuit 94 is a bandstop filter or parallel-resonant network tuned to an incoming carrier frequency Fν originating at a vehicle which travels through the critical zone in question and is equipped to transmit information to a control station in that zone. The primary circuit 92 of the transformer 93 is capacitively tuned to the frequency band Bν of transmission from the vehicle.

The receiver 95 located at the control station is tuned to carrier frequency Fν and demodulates it whereupon a loudspeaker 35 reproduces the message signal generated on board the vehicle. The tuned primary circuit 92 and the bandstop filter 94, connected to the outer conductor of the coaxial cable 20, are grounded at their ends remote from conductor 90.

Because of the high impedance developed between the outer conductor or sheath 90 of the cable and ground, there is thus provided a substantially perfect decoupling between those elements of the coaxial cable which enable it to be operated as a transmitting antenna and those which enable it to operate as a receiving antenna.

The inherent-loss transmission line 20 is generally terminated in its characteristic impedance. However, this condition may not be satisfied if the transmission line is located close to metal structures, for example, which tend to result in parasitic reflections which can cause such a degree of interference as to cancel the transmission of the signals. In this case, the line is mismatched by terminating it in a load other than its characteristic impedance, in order to create a standing-wave ratio which is such as to minimize the influence of the interfering metal structures.

Figure 3:
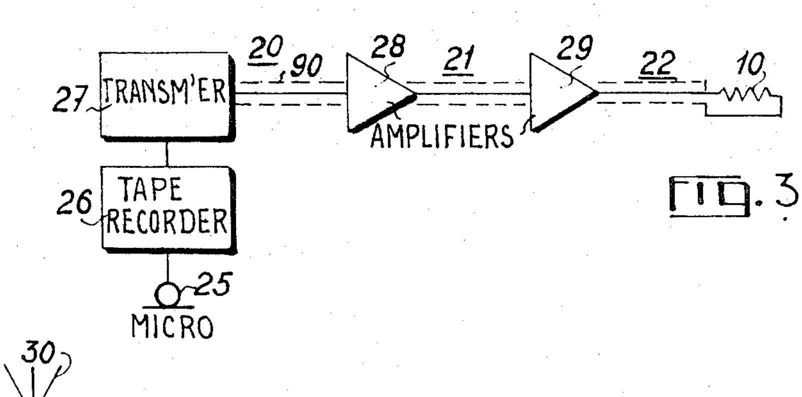
FIG. 3 is a block diagram of a device designed only for transmission.

The device of FIG. 2 can be simplified if it is used exclusively to transmit information to the vehicles. FIG. 3 is a block diagram of this kind of limited-radiation transmission device where the microphone 25 is connected to the transmitter 27 via a tape recorder 26. The latter, of the closed-loop kind, records the information which the operator dictates through the microphone 25 and transmits this information which generally has to be repeated several times and is addressed for example to motorists entering the zone covered by the transmission in question. The operator can, however, intervene directly to announce special information which need not be repeated. The transmitter 27 is coupled to a coaxial cable which in the example described comprises several sections 20, 21, 22 separated by amplifiers 28, 29. The last section illustrated is terminated in a dissipative load 10 tuned to the cable impedance. Because in the case of FIG. 3 it is purely transmission to the vehicles which is involved, it is not necessary to achieve perfect decoupling between the cable and ground. The transmitter, preferably frequency-modulated by the information stored on the tape recorder 26, supplies a certain level of high-frequency power at the selected transmitting frequency F1 to the cable section 20. Part of this power is radiated through the partial overlap out of conductor 90 of the cable and only a fraction thereof arrives at the amplifier 28 in which the cable section 20 terminates. This amplifier supplies to the second cable section 21 a power again equal to the original level and the same is true of the amplifier 29 connected to the terminal section 22.

Thus, in practice, the coaxial cable constituting the antenna of the device in accordance with the invention is installed in the critical zone e.g., along the road route where control of traffic is to be effected, this cable possibly being simply laid on the surface or buried at a small depth. Whatever the case, its installation poses no major problems. It goes without saying that the power transmitted and the overlap coefficient of the cable utilized are chosen as a function of certain parameters, namely :

- the field strength to be developed in consideration of width and length of the road being monitored ;
- the sensitivity of the receivers installed in the vehicles and the frequency or frequencies to be used for the operation of the system.

Figure 4:
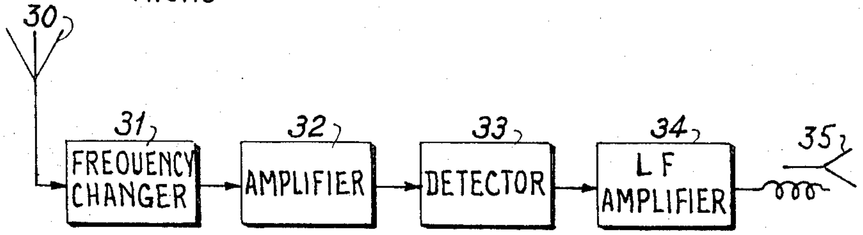
FIG. 4 is a block diagram of a receiver installed in a vehicle and receiving transmissions from the device shown in FIG. 3.

FIG. 4 is a block diagram of a receiver designed for installation in vehicles eligible for the reception of the information transmitted by a device such as that described with reference to FIGS. 2 and 3.

This vehicle-borne receiver comprises a receiving antenna or aerial 30 designed to pick up the field of radio frequency F1 radiated by the sections of coaxial cable 20, 21, 22, for example. This antenna is coupled to a circuit 31 of the frequency-changer type connected to an intermediate-frequency amplifier 32. A detector circuit 33 is connected on the one hand to the circuit 32 and on the other to an audio or low-frequency amplifier 34 which supplies a loudspeaker 35. This is a conventional receiver design. However, the detector device 33 comprises a threshold circuit (or silence circuit) adjusted so that the receiver does not operates unless the received field is at least equal to the field radiated at the time of transmission. The receivers installed in the vehicles are all set to the same frequency, F1 in the present instance, which enables them to be utilized in any critical zone equipped with a transmitter in accordance with the invention, since the range of this kind of transmitter is controlled so that it cannot be picked up in a neighboring critical zone.

So far, mention has been made of only one transmitting frequency F1. Naturally two or more transmitting frequencies could be used in the devices forming the subject of the present invention.

Figure 5:
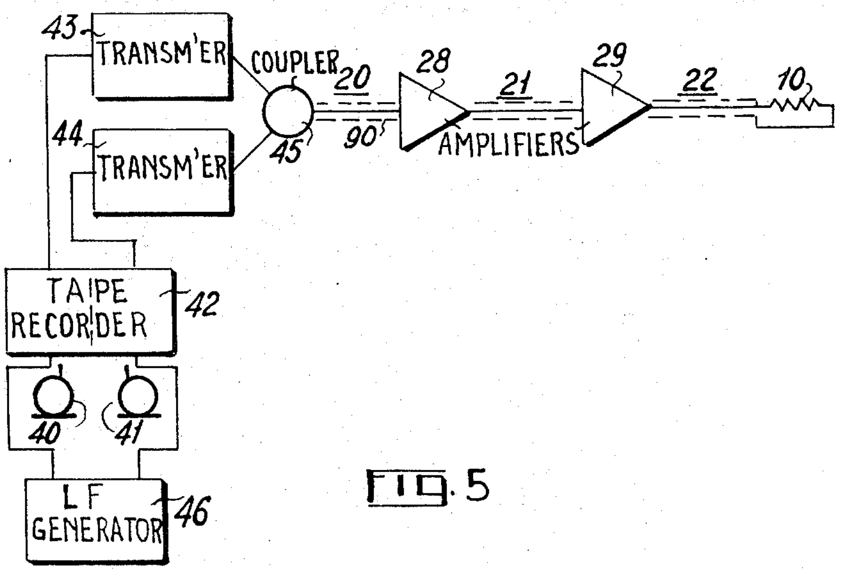
FIG. 5 is a block diagram of a limited-radiation device operating at two frequencies.

In fact, in the critical zones in question it is desirable to communicate to the drivers two or more types of information relating for example to two main flows of traffic in the zone. Thus, each type of information is allotted a particular transmitting frequency, these frequencies being F1 and F2. FIG. 5 schematically illustrates the transmitter device utilized in this particular instance, this device does not differ substantially from the single-frequency transmitter of the earlier figures.

The two kinds of information transmitted are recorded on a twin-track continuous tape recorder 42, through two microphones 40 and 41. Each of the tape recorder tracks is connected to a transmitter, 43 and 44 respectively, whose output signals frequency-modulate the carrier frequencies F1 and F2. The two transmitters are connected to the coaxial cable sections, acting as antenna, through the intermediary of a coupler 45. Obviously, the amplifiers 28, 29 have a passband which covers the two frequencies F1,F2.

In order to advise a driver listening in on one of these frequencies that an announcement is about to be made over the other channel we provide, at the transmitting station a generator 46 producing periodic audio signals that are superimposed upon the transmitted message signals. These monitoring audio signals can be recorded on a track of the associated tape recorder 42 and then supplied to the channels in which the message signals coming from the microphones are supplied to the transmitters 43 and 44. The receiver on board a vehicle in this case comprises means for detecting this additional modulation.

Figure 6:
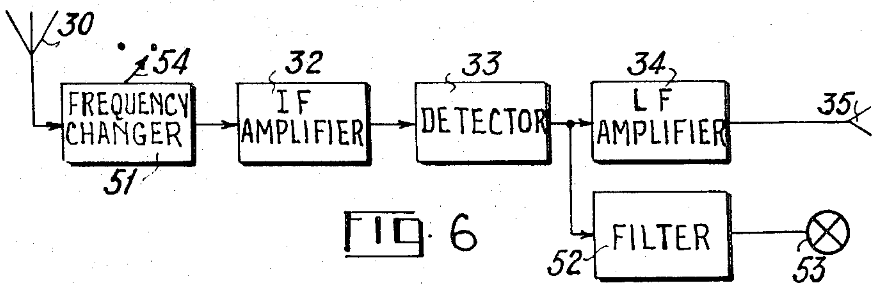
FIG. 6 is a block diagram of a receiver associated with the transmitter of the preceding figure.

FIG. 6 illustrates this kind of receiver, with a receiving antenna 30 capable of picking up the transmissions at one or the other of the frequencies F1, F2. This antenna is coupled to a frequency-changer circuit 51 with a switch 54 enabling either the frequency F1 or the frequency F2 to be received. This frequency-changer circuit is followed by a circuit incorporating an intermediate frequency amplifier 32 and a detector 33, the latter embodying a threshold circuit which operates under the conditions already referred to. The detector is followed by a low-frequency amplifier 34 supplying a loudspeaker 85. This receiver likewise embodies a selective filter amplifier 52 in parallel with low-frequency amplifier 34, in order to isolate the monitoring signals which indicate that there is a transmission taking place through a given channel, as by energizing a flasher device 53. The latter advises a driver listening is on one frequency that a message is being transmitted on the other frequency. The signal recovered by the circuit 52 is superimposed upon the audio signal and advantageously consists of a train of recurrent 3-Khz bursts of 50 ms duration. The operation of this kind of dual-frequency system is not fundamentally different from that which has been described above with reference to single-frequency systems. In the case where only one kind of information is being transmitted, transmission is effected simultaneously over the two carries frequencies.

Our system may also employ more than two frequencies, each of which carries a different kind of information.

However, instead of transmitting at a number *n* of carrier frequencies, it is possible to utilize a system of the multiplex type in which a single carrier frequency is employed, this carrier being modulated by a composite signal made up by the *n* types of information which it is required to transmit.

Advantageously, in this case conventional low-frequency coder and decoder systems will be used, for example the stereo system used in frequency-modulation.

FIGS. 7 and 8 respectively illustrate, in schematic form, the transmitting and receiving sections of a multiplex system based upon the principles of the present invention.

A certain number of microphones 60 to 63 each enable the service operator to record the information message on the corresponding track of a multitrack tape recorder 64 employing a closed-loop tape. The message signals coming from the tape recorder are supplied to a coder 65 wich produces a composite complex signal from the n signals which it receives. This complex signal is supplied to a wideband transmitter 66 and modulates the carrier frequency thereof. The transmitter 66 is coupled, as in the cases already referred to, to the successive coaxial cable sections (20, 21, 22) with their partial overlap and consequent leakage. The last section 22 is terminated in a matched dissipative load 10. The receiver corresponding to the transmitter is shown in FIG. 8 and, commencing from the receiving antenna 30, comprises a circuit similar to those already described, including a frequency changer 31, an intermediate-frequency amplifier 32, a threshold detector 33, a low-frequency amplifier 34 and a loudspeaker 35. However, between the detector 33 and the low-frequency amplifier 34 there is inserted a decoder circuit 70 whose function is to retrieve the various modulating signals from the composite signal generated in the coder circuit 65 of the transmitter.

Each of the output channels of the decoder circuit, corresponding to a modulating signal characteristic of one type of information, contains a selective amplifier circuit 71, 72 . . . 74, respectively, each being connected for example to a warning light 76 which when it flashes indicates that information is being transmitted through the corresponding channel. A switch 75 enables this channel to be selected. The transmitting section again includes generator 46 for monitoring signals of this kind.

FIG. 9 illustrates, in the form of a schematic diagram, a system in which the coaxial cable plays the part of both transmitting and receiving antennas. This more elaborate embodiment represents a single-frequency system; however, everything that has been said about the dual-frequency and multiple-frequency systems, and the associated multiplex system, in conjunction with preceding figures is applicable to the embodiment of FIG. 9.

It will be observed that certain of the elements which make up FIG. 9 already occur in FIG. 2 described above.

Although, in many instances, our system need only transmit information from a control station to the users, i.e., to the drivers of vehicles entering or traveling within the controlled zone, it is desirable in certain cases that the control station be able to receive information from the vehicles circulating in the zone. Generally, this applies to service vehicles such as police cars, ambulances or vehicles belonging to specially authorized drivers. Under these conditions, we prefer to enable the transmitting equipment to be utilized for reception as well.

In FIG. 9 the coaxial cable, which is used as a transmitting/receiving antenna, comprises two sections 20, 21 separated by a machining transformer 82, 83; outgoing-carrier amplifier 28, designed to compensate for power losses which take place in the section 20, is connected by way of matching transformer 80 and coupler 45 to the transmitter 43 which operates at carrier frequency F1. The transmitter 43 is connected, as already described, to a microphone 25 via a closed-loop tape recorder 26 serving to store the information spoken into the microphone 25. The coupler 45 enables "service" information to be transmitted at a carrier frequency F3 which differs from F1, the latter information being produced through a microphone 40 and modulating a transmitter 44 which is connected to the transmitting antenna through the transformer 80.

It will be observed that the last section of coaxial line 21 is terminated, by way of a matching transformer 87, in a dissipative load 10. The coaxial cable sections 20 and 21 have to operate also as receiving antennas; thus primary circuits for transformers 81, 84, 86 and a band-stop filter 88, tuned to the frequency of transmission F*v* used by service vehicles for example, are connected at the ends of the two coaxial cable sections between their outer conductors and ground. An amplifier 85, arranged between the tuned circuits that are coupled to each other by the transformers 84 and 86, is designed to amplify the incoming carrier F2 picked up by the section 21 and coming from the mobile station, its output thus serving to reinforce the carrier energy picked up by transmitting at frequency F2, prior to transmission to the section 20. In a conventional receiver circuit this incoming carrier Fv is transmitted, beyond the transformer 81, to a frequency-changer stage 31 connected to an intermediate-frequency amplifier 32, thence to a detector 33 with a threshold circuit, and after that to a low-frequency amplifier 34 which feeds to a loudspeaker 35. A switch 89 can be provided enabling either a "local" operation, i.e., reception restricted to the critical zone in question, or a connection to a telecommunications network 891. Through the intermediary of this network, the communication device assigned to a given zone can establish links with other similarly equipped vehicles traveling for example within another critical zone.

The frequency bands containing the frequencies used for transmission from a zonal control station to the vehicles, as well as the frequencies used for reception by a control station from a vehicle traveling through the zone, are selected so that the coupling transformers behave as band filters.

FIG. 10 showing power H plotted against frequency *f*, illustrates how these bands 102 are located in relation to one another in the scale of frequencies. The band 101 is the lower frequency band, serving for transmission from a vehicle, and the band 102 is the higher frequency band, serving for transmission from the critical zone.

FIG. 11 illustrate a transceiver station installed in a service vehicle for example, which is to receive transmissions from a zonal control station and transmit messages back to it.

The antenna 30, which may for example be a frame, is connected to a coupler 110 one of whose inputs is connected to a receiver system similar to that already described for example with reference to FIG. 6, its other input being connected to a transmitter 111 operating at frequency F*v*. The transmitter is connected to a microphone 112.

Thus, we have disclosed several embodiments of devices for establishing communication between a control station in a critical zone and the vehicles traveling through it. These devices, as we have seen, necessitate a special installation on board the vehicles; it is therefore advantageous to provide means whereby such equipment could be hooked up to a conventional radio receiver of the kind often already available in road vehicles. It is obvious, in such a case, that many of the elements of the receiver system embodying our invention will be present in the existing equipment.

FIG. 12 shows simple switchover means for selective utilization of the same low-frequency circuit to receive the two types of modulating signals. An audio stage in the form of a low-frequency amplifier 124 provided with a volume control 125, is connected to the two channels respectively transmitting the two modulations in question. The audio signals constituting an ordinary radio program are applied to an input terminal 120 whereas the traffic-control information appears at an input terminal 121. A switch 128 enables connection to one or the other channel. Resistors 122 and 123 in each channel, whose junction is connected to audio stage 124, are respectively short-circuited in an up position and in a down position, of switch 128 but in the midposition of the switch are fully effective to introduce attenuation so that it is possible to receive either type of signal without missing the other one. With the switch in its central position, simultaneous half-power reception of the two signals will be heard.

However, this listening to two acoustically superimposed signals may be objectionable and entails the risk that the driver will not properly be able to understand the special information which is of interest to him.

To overcome this drawback one of the incoming signals is given priority over the other. Thus, in the channel which receives signals from the privileged transmitter, the switch 128 which enables simultaneous monitoring of both channels is preceded by, a second switch 127, FIG. 13, which is controlled by the low frequency signals having priority.

The modulating signals from any conventional radiobroadcasting station arrive at terminal 120 and are heard to the exclusion of any others through the audio amplifier 124 when the switch 128 is in the up position. When switch 128 is in the down position, the traffic information signals arriving at 121 are heard.

When the switch 128 in tandem with switch 127 is in its middle position, the signals received at terminal 121 (which generally arrive only intermittently) are given priority; upon being received, they trigger the switch 127 which inhibits the simultaneous reception of the two signals, and allows the privileged information to be heard preferentially. The reverse procedure takes place when the priority transmission ceases.

Switch 127 is connected to the central bank contact M of the switch 128, i.e. the bank contact which enables simultaneous reception of the two broadcasts. The switch 127 can occupy either of two positions, namely an up position $H_1$ in which it is connected to the input 120 and a down position $B_1$ in which it is connected to the input 121. This switch 127 is controlled by a monitoring relay 130 whose energizing circuit, connected to the input 121, comprises a detector 129 followed by an amplifier 126.

The operation of this device is as follows : The switch 128 is initially in its neutral or center position M and the switch 127 is in its normal position $H_1$, the relay 130 not being energized. When the traffic-information signals appear at the input 121, they are detected by the detector 129 and amplified by the amplifier 126, to energize the coil of the relay 130, causing the latter to attract switch 127 into its alternate position $B_1$. Thereupon the signals coming from the input 121 are received by the audio amplifier 124. The driver wanting to listen to this transmission, having placed the switch 128 in its central position M previously, is no longer disturbed by the half-power program appearing at the input 120.

When the signals at terminal 121 disappear, the relay coil 130 is de-energized so that the switch 127 returns to its up position $H_1$, thus enabling the broadcast appearing at the input 120 to be heard again.

It is understood that, in a manner known per se, the energizing circuit of the relay 130 is given a time constant to make the relay slow-releasing thus ensuring that the switch 127 does not reverse in the course of a transmission appearing at the input 121, in the rhythm of the pauses separating the words.

The coaxial cable acting as an antenna can be replaced by a waveguide with inherent losses or a waveguide with slots distributed over its length.

Our invention is particularly well suited to the control of road traffic in areas of high vehicular concentration. Devices of the same kind could also be used along railway lines or aerodrome runways or in aircraft-taxiing areas.

The traffic-information signals could be transmitted by remote-control and could be displayed on board on a screen on the instrument panel or be read by a passenger in the case of service vehicles.

What is claimed is:

1. In a limited-range radiocommunication system for the exchange of information between a plurality of transmitting and receiving stations including at least two stations each equipped with antenna means and with transmit/receive means coupled to said antenna means, the improvement wherein said antenna means of at least one of said two stations comprises a two-conductor transmission line terminated at one end in a dissipative load, the associated transmit/receive means at said one of said stations including a transmitter coupled to the other end of said transmission line and further including a receiver provided with an input circuit, said transmission line being provided with circuitry tuned to an incoming carrier frequency and coupled to said input circuit, said tuned circuitry being connected between ground and one of the conductors of said transmission line.

2. The improvement defined in claim 1 wherein said transmission line is a coaxial cable with radio-frequency leakage, said one of said conductors being an outer sheath of said cable.

3. The improvement defined in claim 2 said circuitry is connected to an end of said sheath remote from said load.

4. The improvement defined in claim 2, further comprising a parallel-resonant network tuned to said carrier frequency and connected between ground and the end of said sheath proximal to said load.

5. The improvement defined in claim 4 wherein said transmission line is divided into a plurality of sections including a first section provided with said tuned circuitry and a second section provided with said parallel-resonant network, an end of said first section remote from said tuned circuitry and an end of said second section remote from said parallel-resonant network being provided with parallel-resonant circuits respectively inserted between said sections and ground, said parallel-resonant circuits being tuned to said carrier frequency and being reactively coupled to each other.

6. The improvement defined in claim 5, further comprising first amplifier means for outgoing carrier energy in a reactive coupling between said sections and second amplifier means for incoming carrier energy in the reactive coupling between said parallel-resonant circuits.

7. The improvement defined in claim 1 wherein said tuned circuitry comprises a transformer with a capacitively resonated primary.

8. The improvement defined in claim 1 wherein said source includes a recorder for voice messages.

9. The improvement defined in claim 8, further comprising a generator of periodic audio-frequency monitoring signals connected to said recorder and indicator means at a receiving station in said system responsive to said monitoring signals for alerting an operator thereat to the arrival of voice messages.

10. The improvement defined in claim 9 wherein said transmitter at said one of said stations is selectively operable to send out voice messages over a plurality of carrier frequencies, said receiving station being provided with retrieving means for voice-frequency signals from respective carrier frequencies and with selector means in the output of said retrieving means for individual recovery of said voice-frequency signals, said indicator means being operable by said retrieving means to identify any one of said carrier frequencies.

11. The improvement defined in claim 1 wherein a receiving station in said system is provided with a first terminal for radio broadcasts and with a second terminal for information signals from said one of said stations, further comprising an audio stage at said receiving station and switchover means for selectively connecting said audio stage to either of said terminals.

12. The improvement defined in claim 11 wherein said switchover means has a first position connecting said audio stage with full power to said first terminal, a second position connecting said audio stage with full power to said second terminal, and a third position connecting said audio stage with reduced power to both said terminals simultaneously.

13. The improvement defined in claim 12 wherein said switchover means comprises a first resistor connected to said first terminal and short-circuited in said first position, and a second resistor connected to said second terminal and short-circuited in said second position, said resistors having a junction connected to said audio stage and being both effectively in circuit with said junction in said third position.

14. The improvement defined in claim 11 wherein said switchover means has a normal position connecting said audio stage to said first terminal, further comprising monitoring means for automatically moving said switchover means to an alternate position, thereby connecting said audio stage to said second terminal in response to the arrival of information signals at said second terminal.

15. The improvement defined in claim 14 wherein said switch means comprises a first switch tied to said audio stage and selectively connectable to either of said terminals, and a second switch engageable with either of said terminals in said normal position and said alternate position, respectively, said first switch having a neutral position connecting said switches in tandem to said audio stage, said second switch being reversible by said monitoring means.

16. The improvement defined in claim 1 wherein said one of said stations is a fixed control station and the other of said two stations is on board a vehicle.

* * * * *